United States Patent [19]

Feilchenfeld

[11] 4,298,859

[45] Nov. 3, 1981

[54] DIGITAL VIDEO LINE DELAY CIRCUIT

[75] Inventor: Michal M. Feilchenfeld, Pittsburgh, Pa.

[73] Assignee: Westinghouse Electric Corp., Pittsburgh, Pa.

[21] Appl. No.: 151,861

[22] Filed: May 21, 1980

[51] Int. Cl.³ ............................................ G06K 7/016
[52] U.S. Cl. ............................. 340/146.3 Z; 235/456; 235/474; 340/146.3 H
[58] Field of Search ............... 235/436, 454, 456, 474; 340/146.3 H, 146.3 AH, 146.3 Z, 146.3 R; 250/567, 568, 569

[56] References Cited

U.S. PATENT DOCUMENTS

| | | | |
|---|---|---|---|
| 3,528,059 | 9/1970 | Spanjersberg | 340/146.3 H |
| 3,578,953 | 5/1971 | Milford | 340/146.3 Z |
| 3,810,094 | 5/1974 | Mori et al. | 340/146.3 AH |
| 3,852,715 | 12/1974 | Morimoto | 340/146.3 Z |
| 4,009,467 | 2/1977 | Kodera et al. | 340/146.3 AH |

Primary Examiner—Leo H. Boudreau
Attorney, Agent, or Firm—M. P. Lynch

[57] ABSTRACT

Shift registers are employed in a video line delay circuit coupling the output of an analog to digital converter to a digital processor in a line scan camera document reading system to permit a prescribed delay in the transmission of data to avoid loss of data appearing on a document prior to the document scan mark which is used for enabling the digital processor.

7 Claims, 8 Drawing Figures

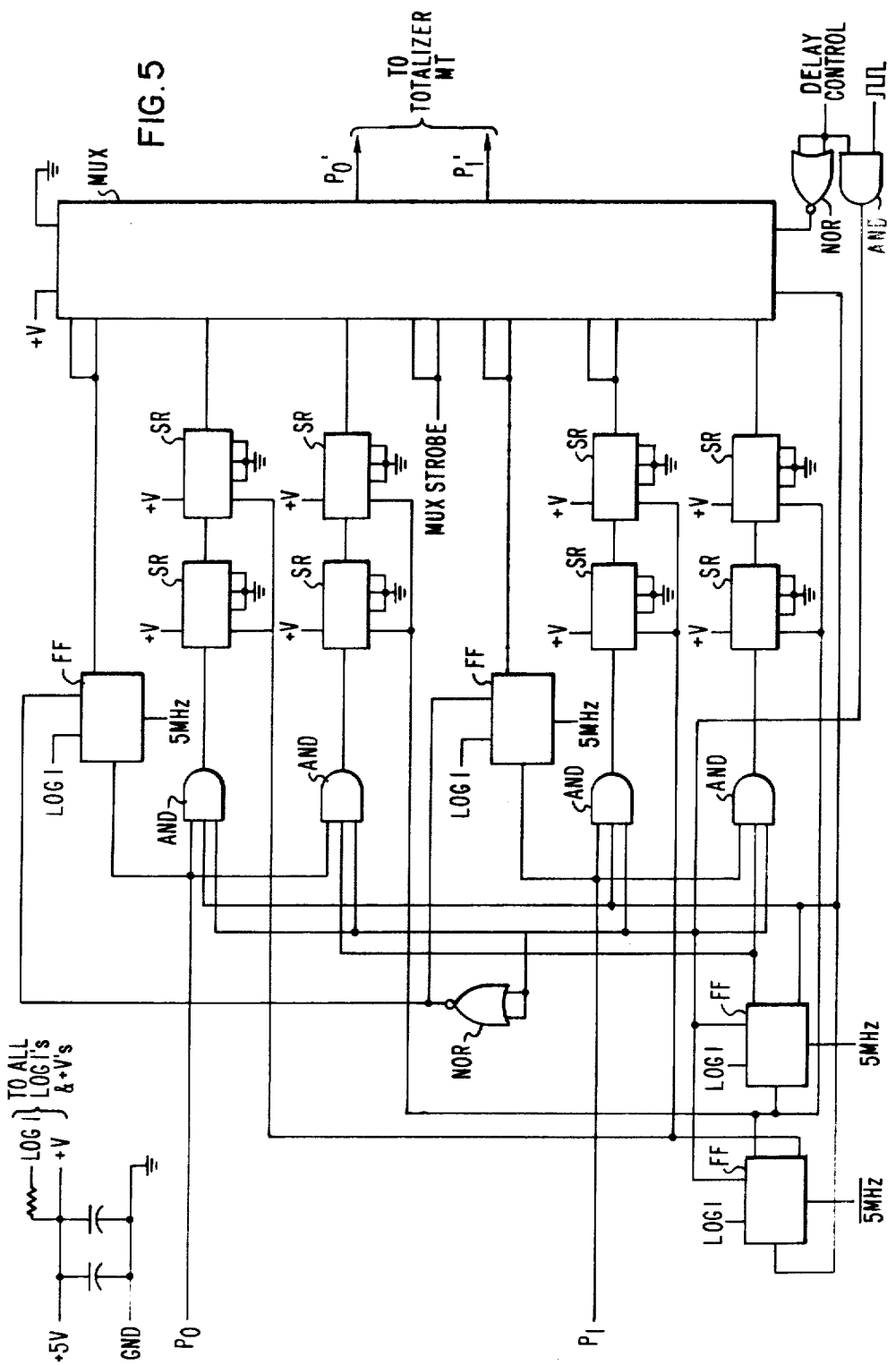

DIGITAL VIDEO LINE DELAY CIRCUIT

BACKGROUND OF THE INVENTION

1. State of the Art:

Optical mark and optical character readers which employ line scan cameras having an array of photosensitive elements develop analog output signals on a line by line basis of a scanned document which provide an indication of the presence or absence of characters or marks on the basis of light reflection from or transmission through the document.

The black/white signature of a scan line, or sweep of line scan camera, across a document, such as a student's test answer sheet, a voting ballot, an order entry form, etc., produces an analog video output signal from the camera. The analog signal is applied to a video normalizer circuit to initially provide a black level compensation and determine the gray level of the discrete picture elements (pixel) of the discrete portions of the analog signal corresponding to the individual photosensitive elements of the line scan camera. The gray level analog output signals are supplied to an analog to digital converter which generates a two-bit output identifying the gray level of each picture element as one of several levels, i.e., 00, 01, 10, and 11, which is subsequently analyzed to determine if the gray level corresponds to an acceptable valid mark or character on the document, or is indicative of the absence of a mark or the presence of a mark which is not sufficiently dark to be recognized as a valid mark. This multi-level mark, or character, density discrimination provided by the two-bit output of the analog to digital converter permits electronic differentiation between a smudge, an inadvertent pencil mark, and a legitimate mark or character appearing on the document.

The utilization of a line scan camera and digital signal processing circuitry for deriving intelligence from a document is described in detail in pending U.S. Application Ser. No. 000,457, filed Jan. 2, 1979, entitled, "Optical Reading System" by J. V. McMillan and D. W. Schroeder, which is assigned to the assignee of the present invention and incorporated herein by reference.

In order for the typical state of the art systems to operate effectively, the system recognizes marks appearing in data entry mark locations only when the marks are preceded by a special printed document mark called a scan mark. The scan marks are used for document verification and registration. This feature precludes the use of the scanner from data sheets where the pre-printed data entry mark locations on the document are located in advance of the printed scan mark.

In order to provide a desired flexibility for such a document scanning system, it is desirable to provide a delay technique whereby the digitized video output signal from the analog to digital converter is delayed by a prescribed number of lines prior to processing. The number of line delays effected by the delay circuit corresponds to the sum of available lines of entry marks on a document which precede the preprinted scan mark and the number of camera scan lines of the preprinted scan mark employed to verify the presence of the pre-printed scan mark.

Thus, on a document format which includes a data entry line corresponding to two scan lines of the camera prior to the presence of a preprinted scan mark, and the system employs two scan lines of the scan mark in order to verify the presence of the scan mark, a suitable delay circuit would correspond to a four line delay.

SUMMARY OF THE INVENTION

There is described herein with reference to the accompanying drawings a delay technique employing shift registers coupled between the multi-bit digital output of the analog digital converter and the system circuitry employed to totalize the digital gray levels of the picture elements of a mark area of the document. The delay technique effects either a zero line delay for those documents on which the preprinted scan marks precede the entry mark locations or single or multiple lines delays for those documents in which data entry mark area locations precede the preprinted scan marks or are coincidental with the scan marks so as to be read by the line scans employed to verify the scan mark. The verification of the scan marks enables the information processing circuitry to accept data entry mark area information.

BRIEF DESCRIPTION OF THE DRAWINGS

The invention will become more readily apparent from the following exemplary description in connection with the accompanying drawings:

FIG. 5 is a detailed schematic implementation of the block diagram illustration of FIG. 4.

DESCRIPTION OF THE PREFERRED EMBODIMENT

Figure 1:
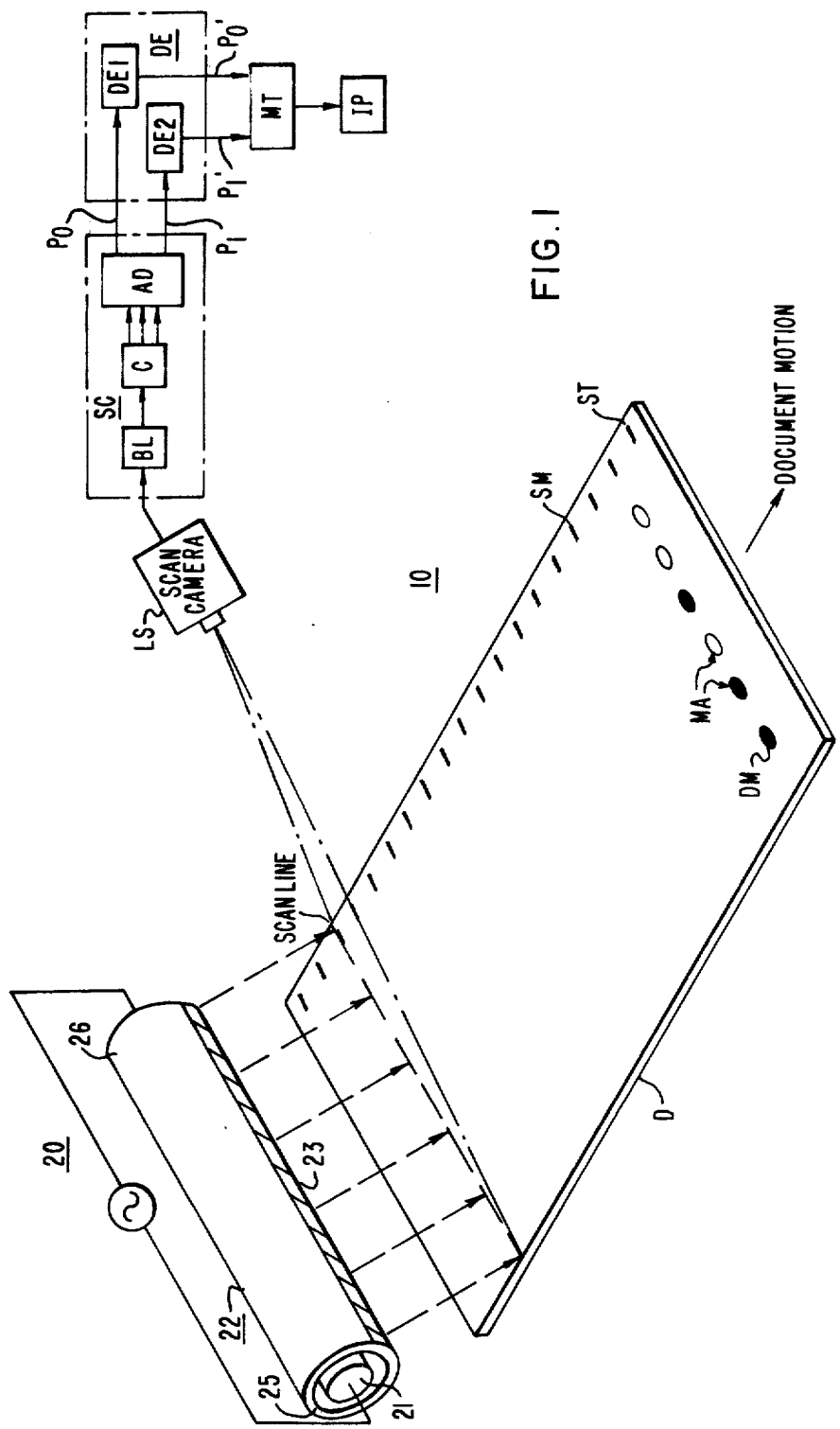
FIG. 1 is a block diagram schematic illustration of a document scanning system employing the invention.

Referring to FIG. 1, there is illustrated an optical reading system 10 employing a line scan camera LS which scans the scan lines SL of the moving document D which are illuminated by the line light source 20. The line scan camera LS can be suitably implemented through the use of commercially available line scan camera systems such as the Fairchild Model CCD1300 which includes a 1024 element charge coupled device as the video signal source. The 1024 element charge coupled device module of the line scan camera LS senses the optical information pattern corresponding to the illuminated line of the moving document D and produces an analog waveform which is proportional to the brightness of the image of the data or information present on the illuminated scan line SL of the document D. The use of a 1024 element charge coupled device as a video pick up provides a high resolution readout of 100 picture elements (pixels) per inch. The document D exhibits a document format having a vertical scan track area ST of scan marks SM and a pattern of data entry mark areas MA, as in a test scoring answer sheet, suitable for accepting a data mark DM typically produced by filling in a mark area MA with a graphite pencil.

Under the operation of the line scan camera LS, each mark area MA consists of a plurality of picture elements, i.e., pixels as defined by the photosensitive elements of the camera LS. The motion of the document D in the vertical direction exposes successive lines of the document to the line scanning camera LS. Thus, the horizontal sweeping of the camera across the width of the document D coupled with the vertical movement of the document D perpendicular to the camera sweep line generates the equivalent of a raster-scanning capability such as that present in CRT displays. Typically, the shift frequency of the line scan camera LS is 5 MHz.

The optical information derived from each pixel, or scan point, by the line scanning camera LS is transmitted as an analog signal to the signal conditioning circuit SC. The signal conditioning circuit SC functions to convert each analog signal representing a pixel into a two-bit digital signal which establishes four levels of gray scale for each pixel. If additional gray scale resolution is required, a digital signal of more than two bits can be generated.

While numerous line light source systems are available for concentrating line illumination on the document D, one such line light source is described in issued U.S. Pat. No. 4,186,431, entitled "Improved Linear Light Source" which is assigned to the assignee of the present invention and incorporated herein by reference.

The signal conditioning or normalizing circuit SC consists of a base, or black line reference circuit, BL which functions to establish a valid dynamic reference for the analog signal by compensating for lens distortions and other extraneous signal influences. The comparator circuit C (which in the instance of a system capable of discriminating four levels of gray would consist of three comparators) compares the incoming analog signal to reference signals of predetermined levels of gray and supplies the resulting output signals to the analog to digital converter AD which converts the four levels of gray into a two-bit digital output signal consisting of signals $P_0$ and $P_1$.

In the application of the system 10 for grading a student's test score in terms of the presence or absence of data marks DM in the marks areas MA of the document D, a first digital level (0,0) is defined as indicative of the absence of any mark, a second digital level (0,1) as an indication of a low density mark, smudge or erasure, while a third digital level (1,0) correspond to a medium density mark, and a fourth digital level (1,1) would indicate a high density mark corresponding to a mark area MA filled in heavily with a pencil. This multiple level discrimination technique which is represented by the two-bit digital output $P_0$, $P_1$, is commonly employed in the state of the art scanners. The only parameter that various between manufacturers is the specific number of density levels employed. The digital output signals $P_0$, $P_1$, are transmitted through a delay circuit DE which may produce a delay from zero up to a predetermined number of scan lines, to a mark totalizer circuit MT. The mark area totalizer MT sums the "weights" of the individual pixels of the mark areas MA and stores the sum for each mark area MA in memory. This is described in the above-referenced pending application. The number of line scans required to completely traverse the document area between consecutive scan marks SM is referred to as a row scan. At the conclusion of the scanning operation of each row scan of the document D, the totalized digital counts of the respective marked areas MA of the row scan, as stored in the marked area totalizer MT, are transmitted for processing by the information processor IP, which may typically be a general purpose host computer.

In the system implementation wherein a two-bit digital output signal is generated by the analog to digital converter D, the delay circuit DE consists of a first delay channel DE1 associated with the $P_0$ output signal of the analog to digital converter AD and a second delay channel DE2 associated with the $P_1$ output signal of the analog to digital converter AD.

Figure 6A:
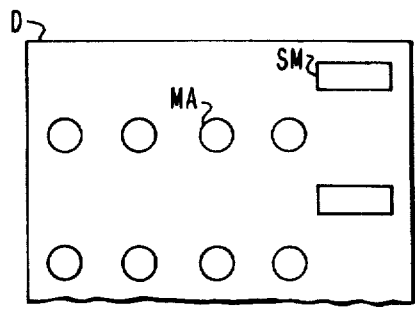
FIGS. 6A, 6B and 6C are illustrations of different pre-printed document formats.
Figure 6B:
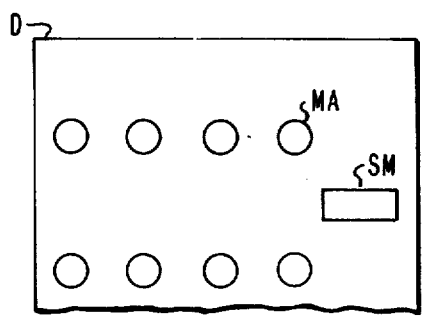
Figure 6C:
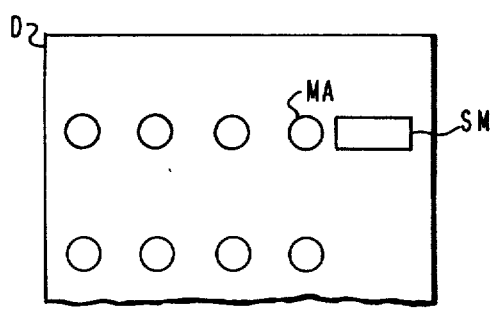

On each preprinted document there are located scan marks SM, one or more of which may be positioned prior to the first rows of mark areas as illustrated in FIG. 6A, or may be located after one or more rows of mark areas as illustrated in FIG. 6B. In the instance of the document of FIG. 6A, delay circuit DE would affect a zero line delay of the signals $P_0$ and $P_1$ inasmuch as the verification of the scan mark SM would have occurred prior to the presence of mark area information and the mark totalizer MT would have been enabled. If, however, a document as illustrated in FIG. 6B was present in the system 10, the contribution of the digital signals $P_0$ and $P_1$ corresponding to one or more rows of mark area MA preceding the first scan mark SM would necessarily be lost until the system verified the scan mark SM and enabled the totalizer MT. Delay circuit DE, in this instance, would delay the signals $P_0$ and $P_1$ corresponding to the scan lines of the rows of mark areas appearing prior to the first scan mark SM until such time as the system 10 verified the scan mark SM. The delay circuit DE can also be implemented to delay the transmission of the digital signals $P_0$ and $P_1$ from the converter AD to the totalizer MT to compensate for an overlap between the scan mark SM and the mark areas MA as illustrated in FIG. 6C. In this document format there are mark areas which are coincidental with a scan mark such that the same line scans of the camera LS are used to verify the scan mark and enable the information processing, and read the information contained in the mark areas.

Figure 2:
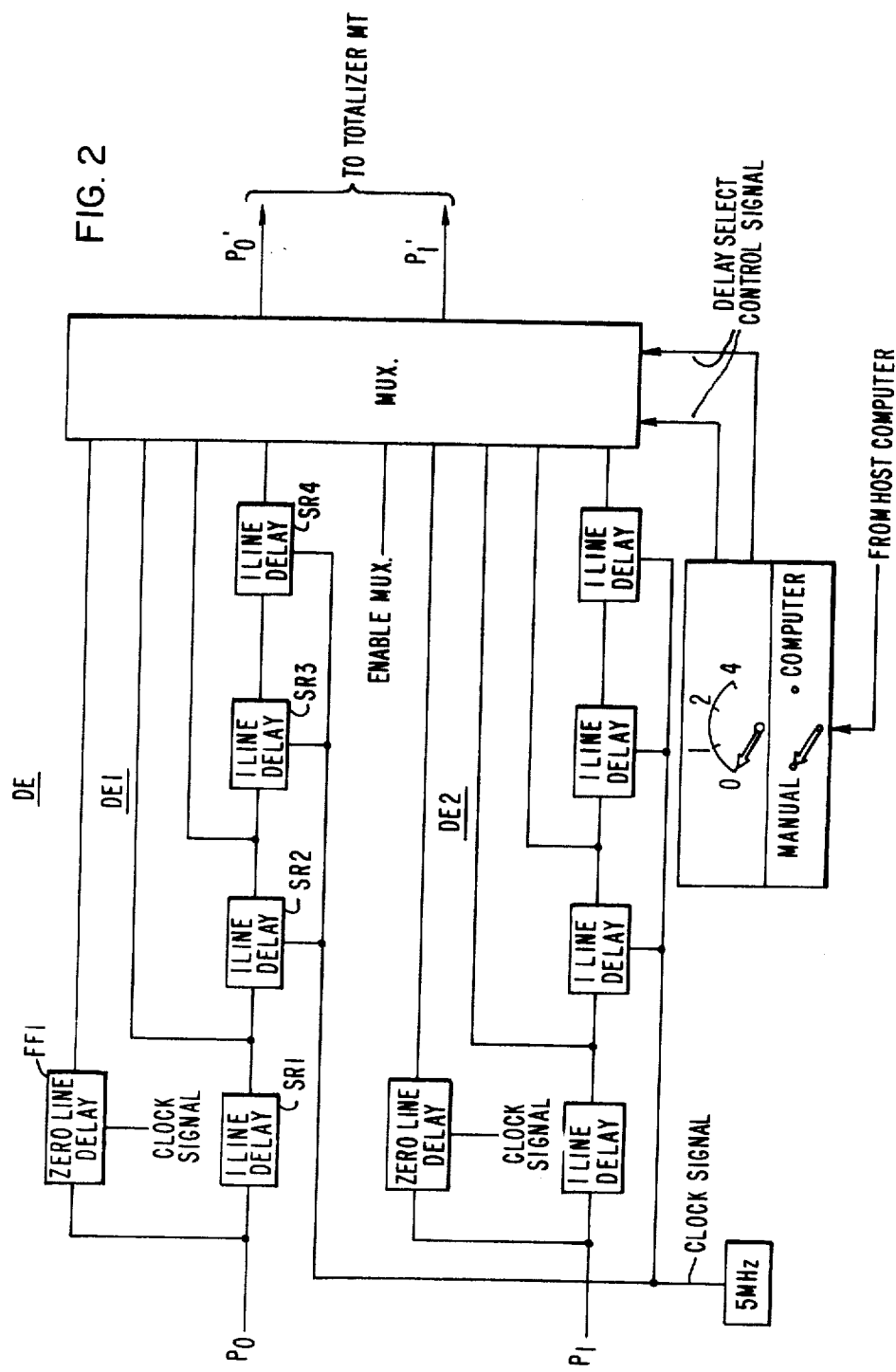
FIG. 2 is a block diagram implementation of a delay circuit suitable for use in the system of FIG. 1.

A typical implementation of the delay circuit DE is illustrated in FIG. 2. Separate, identical delay channels DE1 and DE2 are employed to affect the desired delay of the digital signals $P_0$ and $P_1$ respectively. Inasmuch as the circuitry in operation of the two delay channels is identical, the discussion will be limited to the delay channel DE1. For the purposes of discussion, it will be assumed that the location of the scan mark SM and the document of FIG. 6B would necessitate a four line delay to allow for verification of the first scan mark SM before the digital signals corresponding to the mark area MA preceding the first scan mark SM are processed. Obviously, each document format will dictate the number of line delays required. Each line delay of the four line delay is represented by a shift register SR1, SR2, SR3 and SR4. The zero line delay option, which corresponds to the document format of FIG. 6A, is implemented through the use of a D type flip flop FF1. The digital signal $P_0$ is fed as an input to the zero line delay circuit corresponding to the flip flop FF1 as well as to the series of shift registers SR1-SR4 serially connected with outputs supplied to the multiplexer circuit MUX to provide a 1, 2, or 4 line delay. The multiplexer circuit MUX, in response to a two bit control input from a suitable source, such as the manually operated delay select circuit DS or the host computer H, selects the appropriate delay of 0, 1, 2 or 4 lines by transferring the appropriate input signal from the D type flip flop FF1 or the appropriate shift register SR1-SR4 as an output signal $P_0'$ from the multiplexer circuit MUX.

Suitable commercially available circuitry for implementing the shift registers SR and the multiplexer circuit MUX include types SY2833 and 74S153 respectively. The multiplexer circuit MUX is enabled during those instances when a valid digital input signal P0, P1, etc. is present. Otherwise, all inputs to the multiplexer circuit MUX are maintained at zero to avoid extraneous signals or noise from being transmitted to the mark totalizer circuit MT.

A 5 MHz system clock signal appropriately phased with respect to the 5 MHz system clock signal of the camera LS is used as the clock signal for the shift registers SR1–SR4 of the delay circuit DE.

Figure 3:
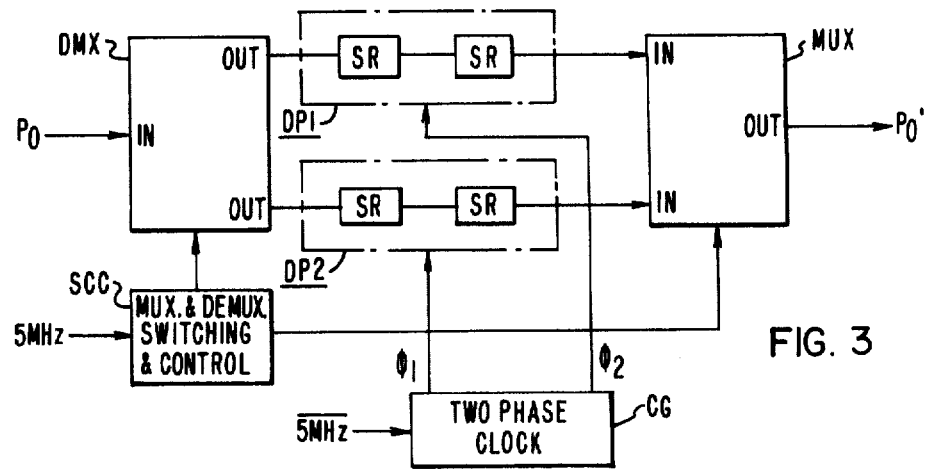
FIG. 3 is a block diagram implementation of a four-line delay circuit for use in the system of FIG. 1.
Figure 4:
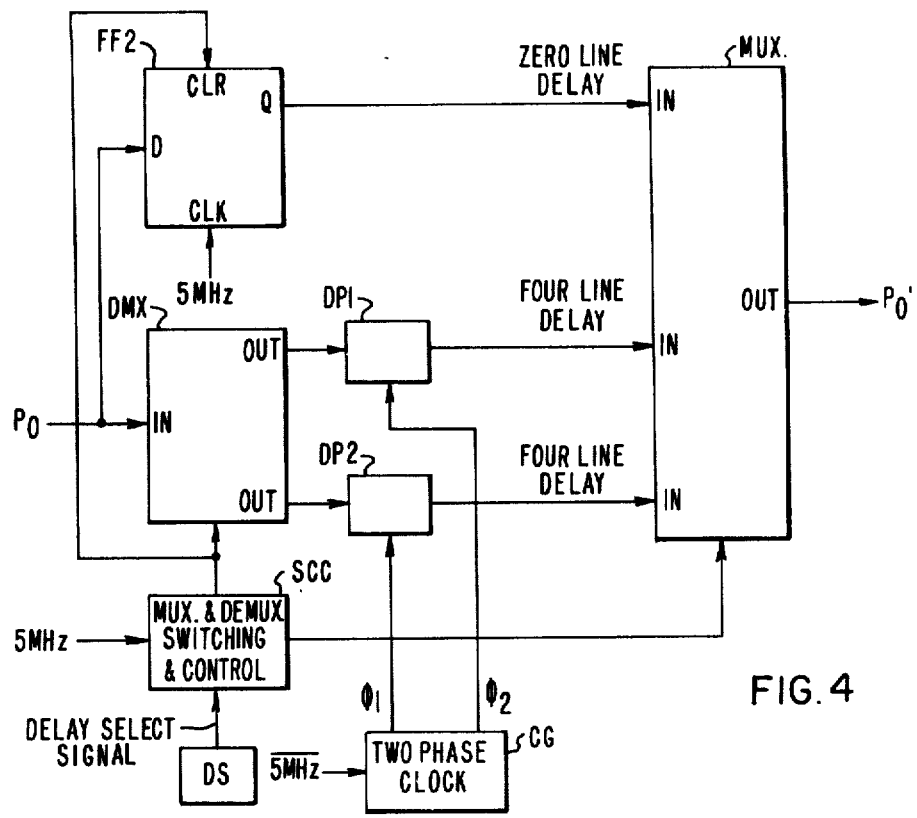
FIG. 4 is a block diagram implementation of a delay circuit providing both a zero and four-line delay suitable for use in the system of FIG. 1.

In the event the clock rate used in system 10 exceeds the maximum clocking rate of available shift registers, the single series connected array of shift registers for the delay channel DE1 of FIG. 2. cannot be used. In this case, the delay function can be implemented through the use of parallel delay paths DP1 and DP2 as illustrated in FIG. 3 for one delay channel. Assuming an implementation of a four-line delay, each delay path DP1, DP2 would consist of two series connected shift registers SR of the type described above using time division multiplexing between the delay paths DP1 and DP2 such that the digital input signal $P_0$ is multiplexed and shifted along two parallel paths at a 2.5 MHz rate which is equal to half the system scanning frequency of 5 MHz. This implementation of the delay channel DE1 requires the addition of a demultiplexer circuit DMX coupling the digital input signal $P_0$ to the inputs of the delay paths DP1 and DP2. A two-phase clock generator CG provides the clocking pulses to the shift registers SR of the delay paths DP1 and DP2 and a switching control circuit SCC controls the operation of the demultiplexer circuit DMX and the multiplexer circuit MUX.

The demultiplexer circuit DMX responds to the control input from the switch control circuit SCC by synchronously switching the digital input signal $P_0$ between the delay paths DP1 and DP2. The multiplexed data shifted through the shift registers SR of delay paths DP1 and DP2 in response to the two-phase output from the clock generator CG is reassembled as a four-line delayed version of the digital input signal $P_0$ by the multiplexer circuit MUX which in turn transmits the four-line delay digital output signal $P_0'$ to the mark totalizer circuit MT. The zero line delay is once again implemented through the use of a D-type flip-flop FF2.

A typical detail implementation of the above circuitry including the switch control circuit SCC, the demultiplexer circuit DMX and the clock generator CG is shown in FIG. 5. This circuitry for a single delay channel, typically consists of a 74S74 dual D flip-flop, two 74S11 triple input AND gates and two 74S02 NOR gates respectively. For two delay channels for 74S11 triple input AND gates are required as shown in FIG. 5.

I claim:

1. In an optical reading system having a line scan camera for scanning a document on a line-by-line basis and generating an analog signal for each video scan line indicative of information appearing on the document, said document having preprinted scan marks for document verification or registration and data entry mark areas for accepting information such as a student test answer sheet, a voting ballot, an order entry form, etc., an analog-to-digital converter means for converting the analog signal to a digital signal, and a totalizer circuit means for summing the digital signals corresponding to each of the mark areas and storing this information for processing, the improvement for rendering the system compatible with both a preprinted document format that has a scan mark preceding the first data entry mark areas, and a preprinted document format that has data entry mark areas preceding the first scan mark, the improvement comprising:

a video scan line delay means connected between said analog-to-digital converter means and the totalizer circuit means, said delay means including a zero line delay for transmitting the digital output of the analog-to-digital converter means without any delay, and one or more line delay circuits, each producing a digital delay output signal corresponding to a different predetermined number of line delays of the digital output signal of said analog-to-digital converter means, and a delay select means for selecting one of said outputs of said video scan line delay means for transmission to said totalizer circuit means, the zero line delay circuit output being selected for a document format wherein a scan mark precedes the first data entry mark areas, in the event the document format consists of data entry mark areas preceding the first scan mark, said delay select means selecting the digital delay output of the line delay circuit which produces a sufficient number of line delays in the transmission of the digital signals from said analog-to-digital converter means to said totalizer circuit means to prevent the loss of information appearing in the data entry mark areas preceding the first scan mark or appearing during the line scan verification of a scan mark.

2. In an optical reading system having a line scan camera for scanning a document on a line-by-line basis and generating an analog signal for each video scan line indicative of information appearing on the document, said document having preprinted scan marks for document verification or registration and rows of data entry mark areas for accepting information such as a student testing answer sheet, a voting ballot, an order entry form, etc., an analog-to-digital converter means for converting the analog digital to a digital signal, and a totalizer circuit means for summing the digital signals corresponding to each of the data entry mark areas and storing this information for processing, the improvement for rendering the system compatible with a preprinted document format that has one or more rows of data entry mark areas preceding the first scan mark or one or more rows coincidental with the scan marks, the improvement comprising:

a video scan line delay means connected between the analog to digital converter means and the totalizer means, said video scan line delay means including a plurality of line delay circuits, the output of said analog to digital converter means being supplied as an input to each line delay circuit and each line delay circuit producing a digital delay output corresponding to the digital output signal of said analog to digital converter means delayed by a predetermined number of lines, and means for selecting the digital delay output of the line delay circuit which produces a sufficient number of line delays in the transmission of the digital signals from said analog-to-digital converter means to said totalizer circuit means to prevent the loss of information appearing in the one or more rows of data entry mark areas preceding the first scan mark or appearing during the line scan verification of the scan marks.

3. In a system as claimed in claim 2 wherein said line delay circuits include shift registers and a clocking means for advancing said digital output signals from said analog-to-digital converter means through said shift registers, said means for selecting including a multiplexing means, the outputs of said line delay circuits being connected as inputs to said multiplexing means, and a delay select means connected to said multiplexing means to select the digital delay output of one of said line delay circuits for transmission to the totalizer circuit means.

4. A system as claimed in claim 3 wherein said clocking means clocks said shift registers at a rate equal to the shift frequency of the line scan camera.

5. A system as claimed in claim 3 wherein said clocking means clocks said shift registers at a rate which is equal to the shift frequency of the line scan camera divided by an integer greater than one.

6. A system as claimed in claim 1 wherein said zero line delay circuit consists of a D type flip-flop and said line delay circuits include shift registers and a clocking means for advancing said digital signals through said shift registers, said means for selecting including a multiplexing means, the outputs of said zero line delay circuit and said line delay circuits being connected as inputs to said multiplexing means, and a delay select control signal means connected to said multiplexing means to select one of the digital output signals of said video scan line delay means for transmission to the totalizer circuit means.

7. In an optical reading system having a line scan camera for scanning a document on a line-by-line basis and generating an analog signal for each video scan line indicative of information appearing on the document, said document having preprinted scan marks for document identification or registration and one or more rows of data entry mark areas for accepting information such as a student test answer sheet, a volting ballot, an order entry form, etc., an analog-to-digital converter means for converting the analog signal to a digital signal, and a totalizer circuit means for summing the digital signals corresponding to the data entry mark areas and storing this information for processing;

the improvement for rendering the system compatible with a preprinted document format having a predetermined number of rows of data entry mark areas preceding the first scan mark, the improvement comprising:

a video scan line delay means connected between the analog-to-digital converter means and the totalizer circuit means to delay the transmission of the digital output signal of the analog-to-digital converter means to the totalizer circuit means for a predetermined number of line delays sufficient to prevent loss of the information contained in the data entry mark areas preceding the scan mark or in data mark areas coincidental with the scan marks, said video scan line delay means including:

a demultiplexing circuit means having an input and a first and second output, a multiplexing circuit means having an a first and second input and an output, a first and second shift register circuit means connected in parallel between the outputs of said demultiplexing circuit and the inputs of said multiplexing circuit means, said digital output signal of said analog-to-digital converter means being connected to the input of said demultiplexing circuit means;

switching control means being connected to said demultiplexing circuit means and said multiplexing circuit means, said demultiplexing circuit means responding to the control signals from said switching control circuit means by synchronously switching the digital signal from said analog-to-digital converter means to supply alternate digital signals from said first and second outputs of said demultiplexing means to said first and second shift register circuit means respectively;

clocking means connected to said first and second shift register circuit means for shifting said digital signals through said first and second shift register circuit means at a rate which is equal to the shift frequency of the line scan camera divided by an integer greater than one, said multiplexing circuit means responding to said switch control input signal by reconstructing the digital outputs from said first and second shift register means to form a digital output signal corresponding to the digital output signal of said analog to digital converter means delayed by a predetermined number of lines sufficient to prevent loss of information appearing in data entry mark areas preceding the first scan mark on a document or during the line scan verification of the scan marks, the digital output signal of said multiplexing circuit means being transmitted to said totalizer circuit means.

* * * * *